(12) United States Patent
Chentanez et al.

(10) Patent No.: US 10,489,521 B2
(45) Date of Patent: Nov. 26, 2019

(54) MASS CONSERVING EULERIAN FLUID SIMULATION

(71) Applicant: NVIDIA CORPORATION, Santa Clara, CA (US)

(72) Inventors: Nuttapong Chentanez, Bangkok (TH); Matthias Muller-Fischer, Uerikon (CH)

(73) Assignee: NVIDIA CORPORATION, Santa Clara, CA (US)

( * ) Notice: Subject to any disclaimer, the term of this patent is extended or adjusted under 35 U.S.C. 154(b) by 106 days.

(21) Appl. No.: 14/043,499

(22) Filed: Oct. 1, 2013

(65) Prior Publication Data
US 2015/0095006 A1    Apr. 2, 2015

(51) Int. Cl.
*G06F 17/50*   (2006.01)

(52) U.S. Cl.
CPC ...... *G06F 17/5009* (2013.01); *G06F 2217/16* (2013.01)

(58) Field of Classification Search
CPC .......................... G06F 17/5009; G06F 2217/16
USPC ............................................................ 703/9
See application file for complete search history.

(56) References Cited

U.S. PATENT DOCUMENTS

| | | | | |
|---|---|---|---|---|
| 6,009,741 A * | 1/2000 | Wagner | ............... | G06F 17/5018 73/1.57 |
| 2004/0167757 A1* | 8/2004 | Struijs | ................. | G06F 17/5018 703/2 |
| 2005/0253854 A1* | 11/2005 | Lischinski | .............. | G06T 13/60 345/474 |
| 2008/0177519 A1* | 7/2008 | Miller | ..................... | G06T 13/60 703/9 |
| 2011/0307837 A1* | 12/2011 | Cohen | ..................... | G06T 13/60 715/851 |

OTHER PUBLICATIONS

Byrab M. Klingner; Byran E. Feldman; Nuttapong Chentanez; James F. O'Brien, "Fluid Animation with Dynamic Meshes" University of California, Berkeley, 2006, ACM 0730-0301/06/0700-0820, pp. 820-825.*

(Continued)

*Primary Examiner* — Dwin M Craig
(74) *Attorney, Agent, or Firm* — Artegis Law Group, LLP

(57) ABSTRACT

A simulation engine performs a mass-conserving Eulerian fluid simulation by manipulating the distribution of density between nodes associated with the fluid simulation. The simulation engine traces a velocity field upstream to identify the source of mass that currently resides at a given node. The simulation engine then adjusts (i) the density contributions to that source from adjacent nodes and (ii) the density contributions provided by that source to the given node. In doing so, the simulation engine maintains conservation of mass at a local level between nodes within a given neighborhood. As a result, mass is conserved at a global level. One advantage of the disclosed technique is that a fluid interface associated with the fluid simulation may appear physically realistic, because numerical errors typically caused by violations of conservation of mass may be eliminated.

24 Claims, 8 Drawing Sheets

(56) References Cited

OTHER PUBLICATIONS

Nuttapong Chentanez, Byran E. Feldman, Francois Labelle, James F. O'Brien, Jonathan R. Shewchuk, Liquid Simulation on Lattice-Based Tetrahedral Meshes, 2007 University of California, Berkeley ACM 978-59593-624-4/07/0008, pp. 219-228.*

S. Pratap Vanka, Aron F. Shinn, Kirti C. Sahu, "Computational Fluid Dynamics Using Graphics Processing Units: Challenges and Opportunities" Proceedings of the ASME 2011 International Mechanical Engineering Congress and Exposition, IMECE2011-65260, Nov. 11-17, 2011; pp. 1-9.*

* cited by examiner

MASS CONSERVING EULERIAN FLUID SIMULATION

BACKGROUND OF THE INVENTION

Field of the Invention

Embodiments of the present invention relate generally to fluid simulations and, more specifically, to a mass-conserving Eulerian fluid simulation.

Description of the Related Art

A conventional simulation engine typically implements either a particle-based approach or a grid-based approach when simulating a fluid. With a conventional grid-based approach, the simulation engine generates a grid of nodes, and then computes various dynamic properties of the fluid relative to the grid, including velocity, pressure, density, etc. Fluid properties are typically stored on a staggered grid. For a given node, pressure and density are stored at the center of a cell that surrounds the node. X, Y and Z components of velocity are stored at X, Y and Z faces of the cell respectively. A visual representation of the fluid may then be rendered based on the dynamic properties of the fluid.

One problem with the conventional grid-based approach described above is that the total amount of mass associated with the fluid may fluctuate during the fluid simulation due to numerical errors. Such fluctuations are physically unrealistic and violate basic principles, including the conservation of mass. Consequently, artifacts may appear within the visual representation of the fluid and cause the fluid to appear physically unrealistic.

Accordingly, what is needed in the art is an improved technique for simulating the dynamics of a fluid.

SUMMARY OF THE INVENTION

One embodiment of the present invention sets forth a computer-implemented method for modeling a distribution of mass associated with a simulated fluid, including generating a velocity vector for each node in a grid of nodes associated with a fluid simulation, the grid including at least a first node, a second node, and a third node, tracing a velocity vector associated with the third node to an inter-node position that resides between the first node and the second node, combining a first incoming density contribution derived from the first node with a second incoming density contribution derived from the second node to generate a density value for the inter-node position, and computing a first outgoing density contribution associated with the second node and a second outgoing density contribution associated with the second node based on the density value of the inter-node position.

The method further includes adjusting a first set of weight values associated with the first outgoing density contribution and the second outgoing density contribution such that a sum of each weight value included in the first set of weight values equals one, adjusting a second set of weight values associated with the first incoming density contribution and the second incoming density contribution such that a sum of each weight value included in the second set of weight values equals one, updating the density value of the inter-node position based on the second set of weight values, and approximating a density value for the third node based on the density value of the inter-node position.

One advantage of the disclosed technique is that a fluid interface associated with the fluid simulation may appear more physically realistic, because numerical errors caused by violations of the conservation of mass may be reduced.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
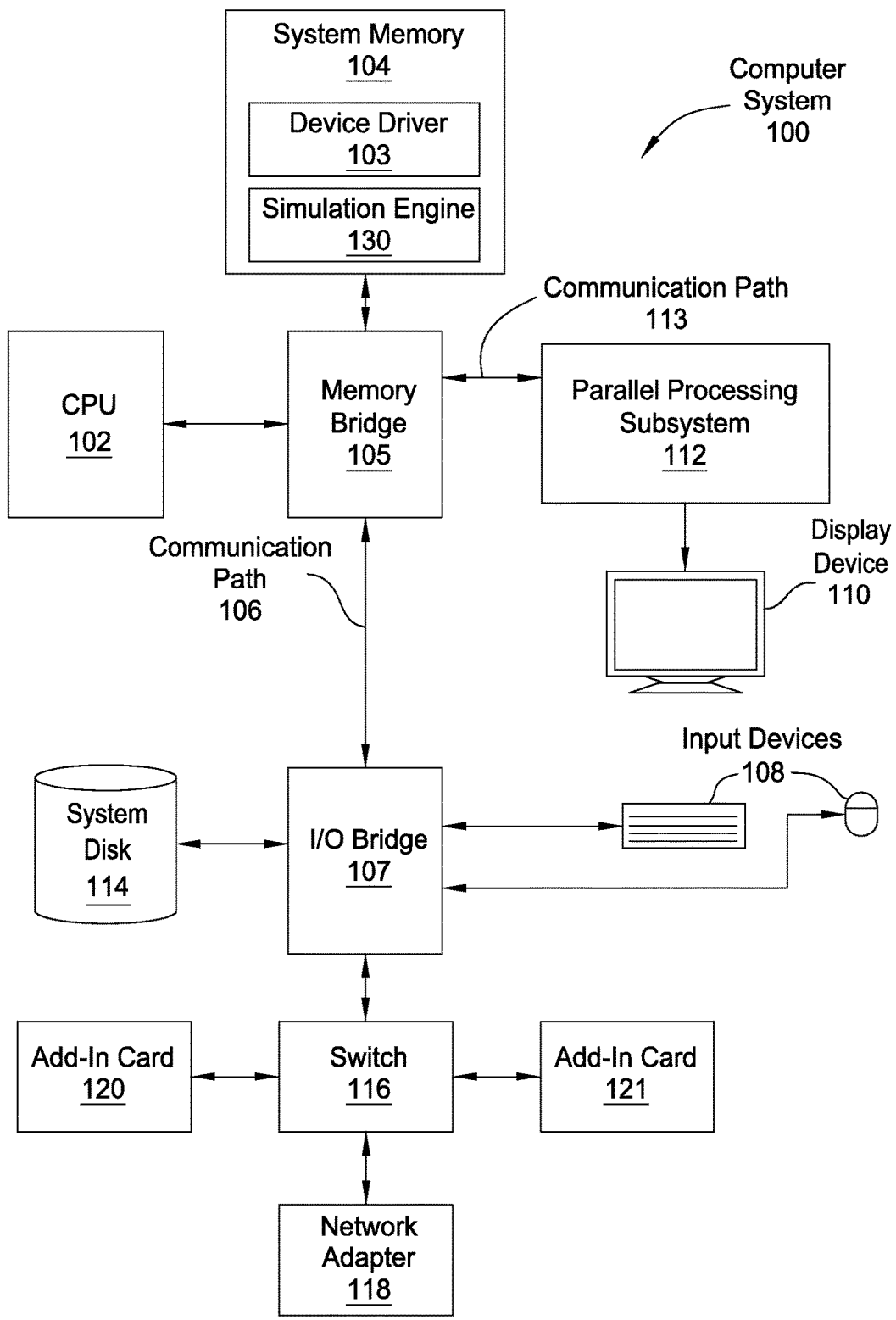
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

System memory 104 also includes a simulation engine 130 that is configured to perform a simulation of one or more fluids. The specific functionality of simulation engine 130 is described in greater detail below in conjunction with FIGS. 3-7H. As a general matter, simulation engine 130 may include program code that executes on CPU 102, parallel processing subsystem 112, and/or both CPU 102 and parallel processing subsystem 112 in conjunction with one another. For example, simulation engine 130 could include host code that is configured to execute on CPU 102 and operate in conjunction with device code that executes on one or more parallel processing units (PPUs) included within parallel processing subsystem 112. The device code could be executed to configure PPUs within parallel processing subsystem 112 to execute parallel threads that perform different computations associated the fluid simulation. Persons skilled in the art will understand that the specific techniques for performing the fluid simulation discussed below may be implemented according to any technically feasible form of parallel processing.

In FIG. 1, in various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
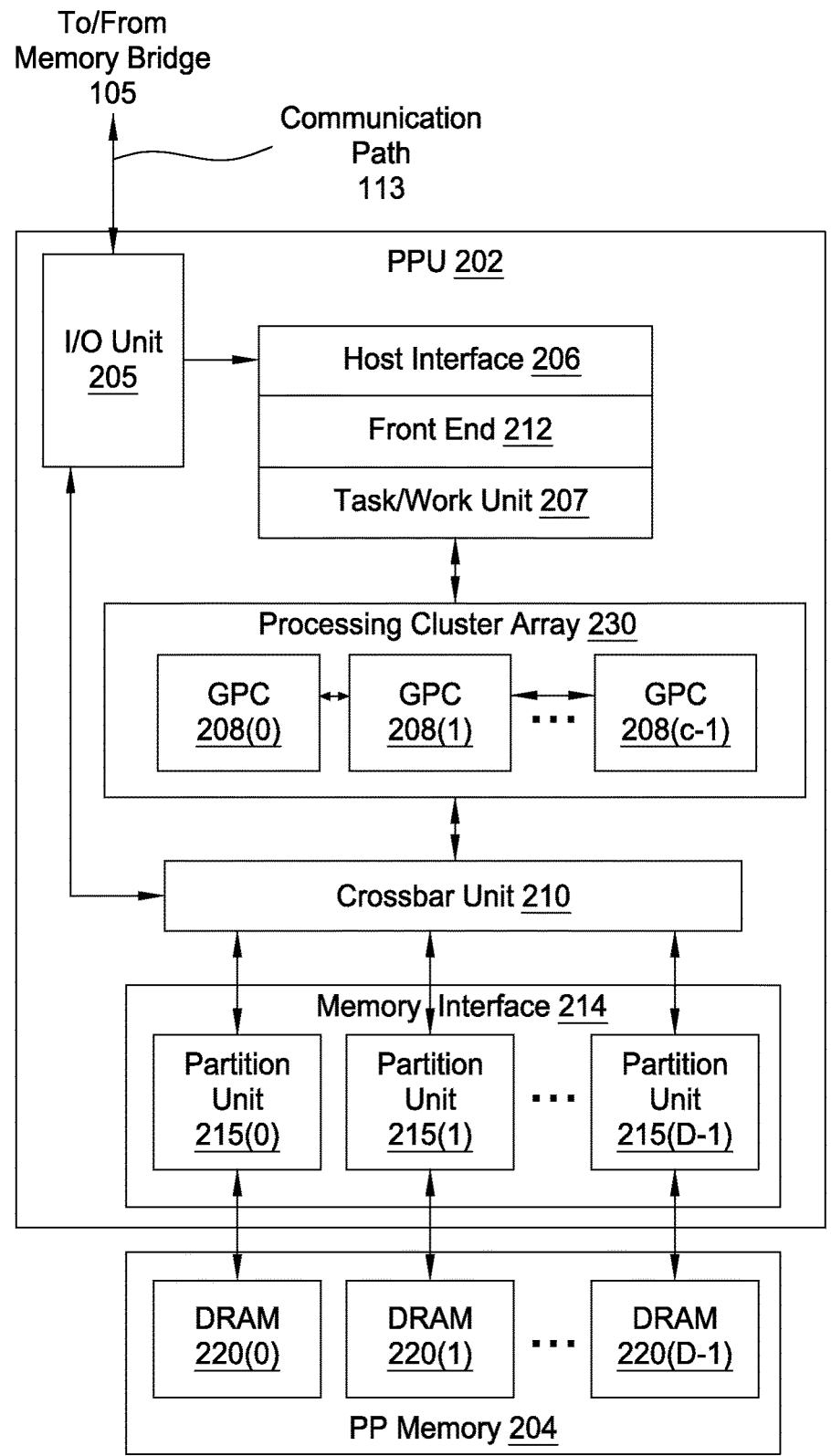
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Mass-Conserving Eulerian Fluid Simulation

Simulation engine 130, referred to above in conjunction with FIG. 1, is configured to implement a simulation of one or more fluids. In doing so, simulation engine 130 may simulate a fluid interface between fluids that have different physical properties, including different densities, pressures, and so forth. The fluid interface could be, for example, the interface between a liquid, such as water, and a gas, such as air. In such a case, simulation engine 130 would simulate the dynamics of the water (and, potentially, the air) such that the interface between the water and the air could appear physically realistic. As a general matter, the techniques described herein are applicable to simulating incompressible fluids, although persons skilled in the art may adapt these techniques for simulating compressible fluids as well.

Figure 4:
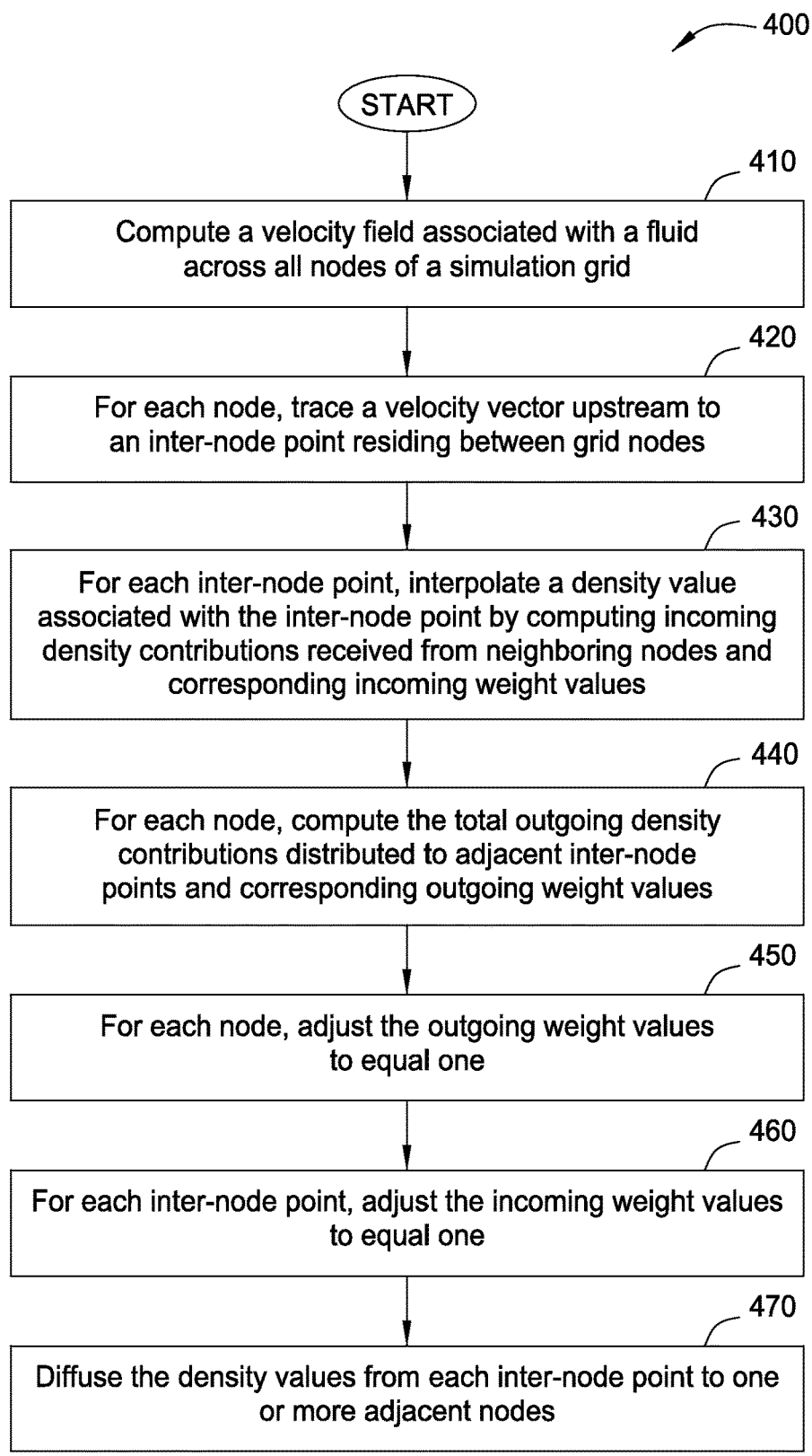
FIG. 4 is flow diagram of method steps for updating the distribution of mass in a fluid simulation, according to one embodiment of the invention.
Figure 5:
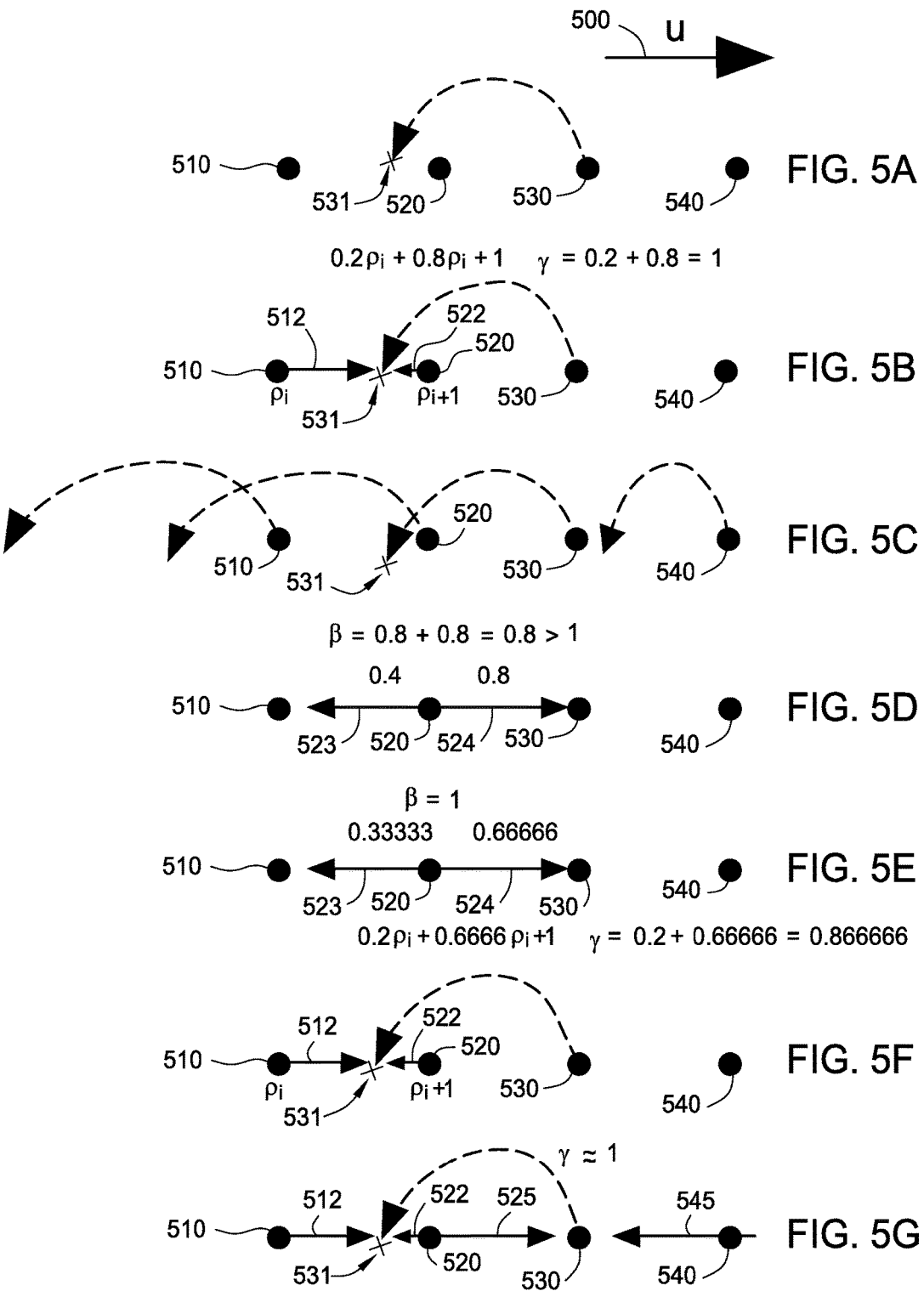
FIGS. 5A-5G are a series of exemplary diagrams illustrating a technique for updating the distribution of mass in a fluid simulation, according to one embodiment of the invention.
Figure 6:
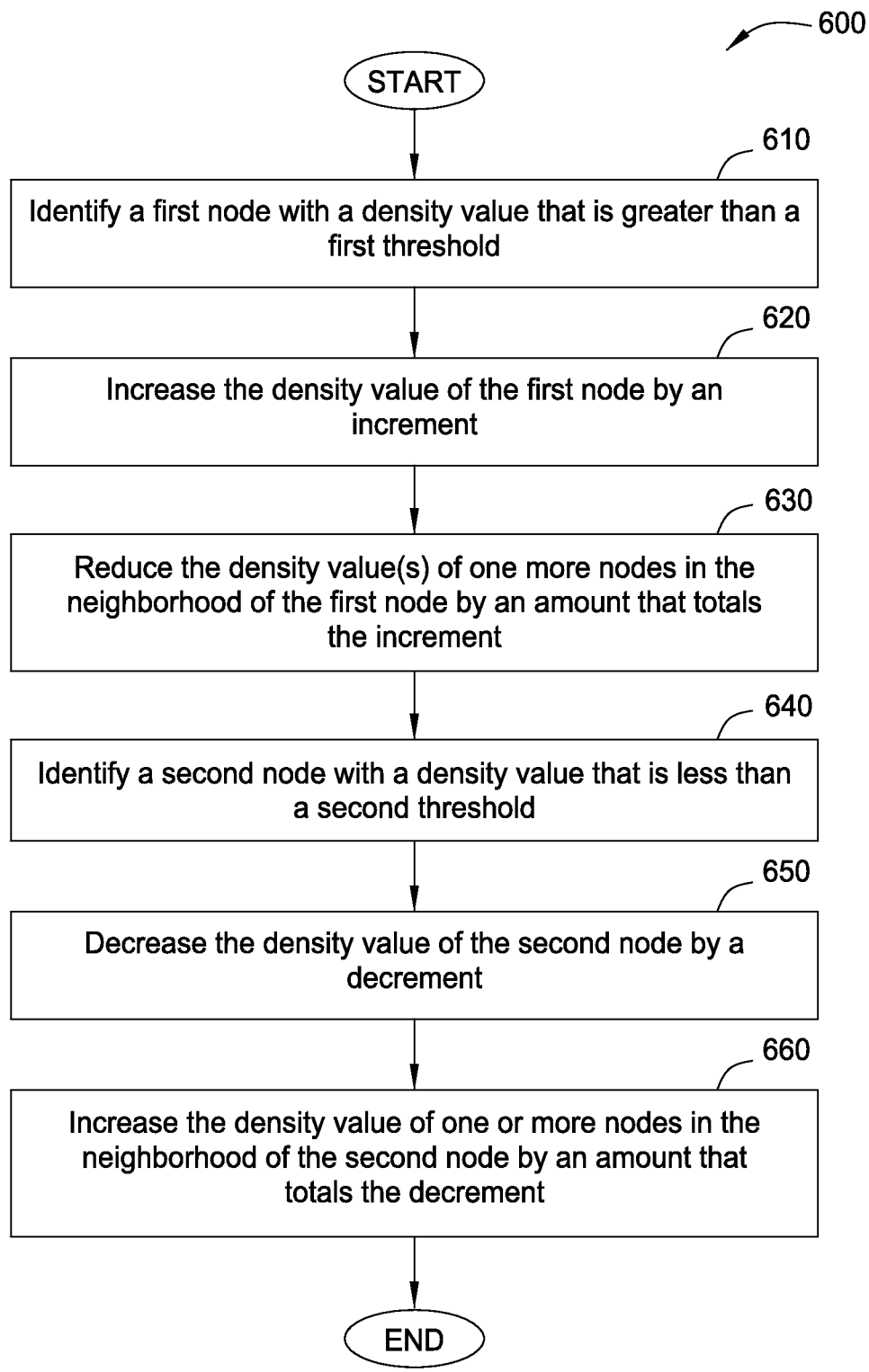
FIG. 6 is a flow diagram of method steps for sharpening a fluid interface in a fluid simulation, according to one embodiment of the invention.

The functionality of simulation engine 130 is described in greater detail herein. In particular, FIG. 3 describes, in stepwise fashion, a general approach for simulating a fluid in the fashion described briefly above. FIG. 4 describes, in stepwise fashion, a specific technique for distributing mass associated with the fluid when performing that fluid simulation. FIGS. 5A-5G describe, by way of example, the technique described in FIG. 4. FIG. 6 describes, in stepwise fashion, a specific technique for sharpening the fluid interface. FIGS. 7A-7H describe, by way of example, the technique described in FIG. 6.

Figure 3:
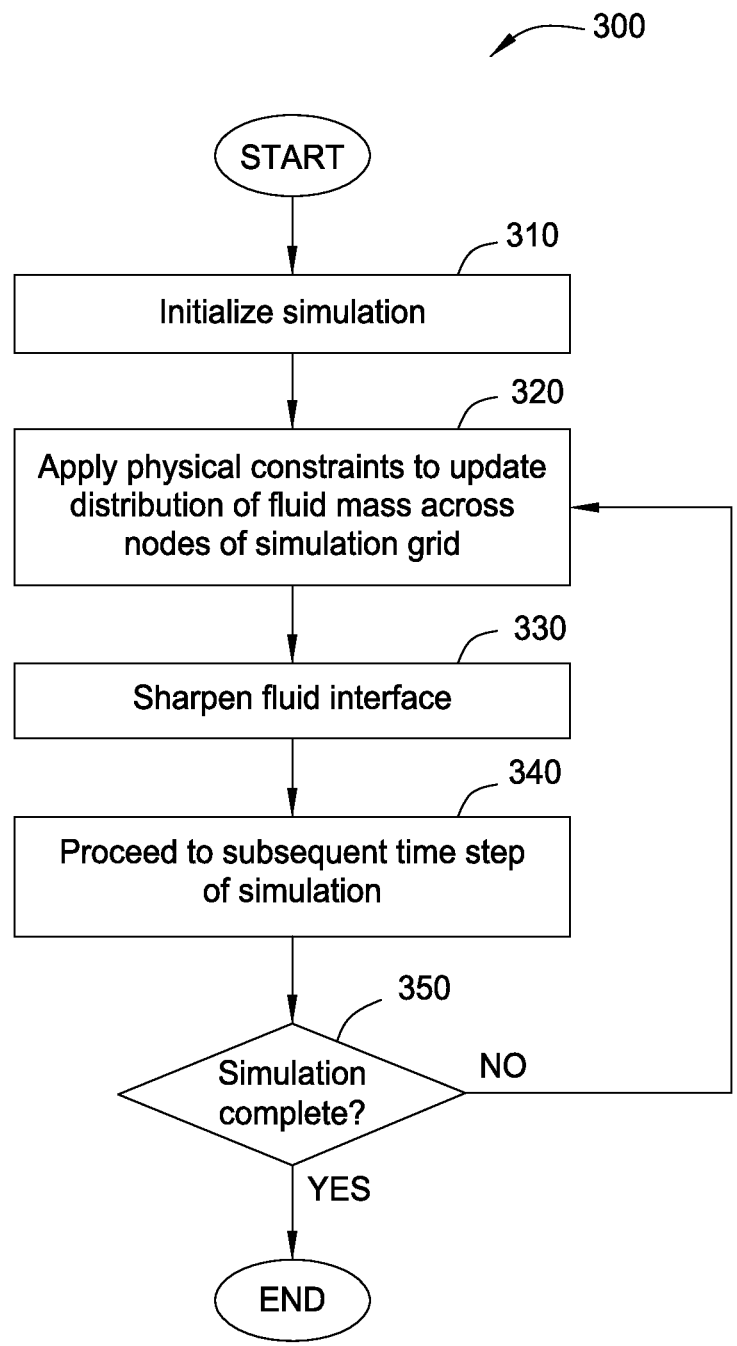
FIG. 3 is a flow diagram of method steps for simulating the dynamics of a fluid, according to one embodiment of the present invention.

FIG. 3 is a flow diagram of method steps for simulating the dynamics of a fluid, according to one embodiment of the present invention. Although the method steps are described in conjunction with the system of FIGS. 1-2, persons of ordinary skill in the art will understand that any system configured to perform the method steps, in any order, is within the scope of the invention.

As shown, a method 300 begins at step 310, where simulation engine 130 initializes a fluid simulation. In doing so, simulation engine 130 constructs a grid of cells within which fluids may be simulated. Each cell is typically associated with a specific node that resides at a particular position within the cell. At a given node of the grid, simulation engine 130 is configured to maintain data that reflects the physical properties of a fluid element associated with the corresponding cell. The physical properties could be, e.g., density, velocity, etc. Simulation engine 130 is also configured to maintain simulation parameters associated with the fluid simulation as a whole, including a number of time steps to run the simulation, a time increment associated with each time step, physical constants such as the gravitational constant G, and so forth.

At step 320, simulation engine 130 performs the fluid simulation by applying physical constraints to the fluid simulation to update the distribution of fluid mass across the nodes associated with the simulation. Simulation engine 130 may apply any of Newton's Laws, the Navier-Stokes equations, or other mathematical formulae that provide an analytical description of the dynamics of a fluid. In addition, simulation engine 130 performs a specific sequence of steps for distributing fluid mass that is described in greater detail below in conjunction with FIGS. 4-5H.

At step 330, simulation engine 130 sharpens a fluid interface associated with the fluid simulation. The fluid interface is generally a boundary between a region of the grid where fluid resides and a region of the grid where that fluid does not reside, as previously mentioned. When sharpening the interface, simulation engine 130 moves mass between adjacent cells of the grid in order to reduce the occurrence of cells that are only partially filled, as described in greater detail below in conjunction with FIGS. 6-7H.

At step 340, simulation engine 130 proceeds to a subsequent time step of the simulation. At step 350, simulation engine 130 determines whether or not the simulation is complete. If the simulation is not complete, simulation engine 130 returns to step 320 and proceeds as discussed above. Otherwise, simulation engine 130 ends the fluid simulation.

Updating the Distribution of Mass

FIG. 4 is flow diagram of method steps for updating the distribution of mass in a fluid simulation, according to one embodiment of the invention. Although the method steps are described in conjunction with the system of FIGS. 1-2, persons of ordinary skill in the art will understand that any system configured to perform the method steps, in any order, is within the scope of the invention.

As shown, a method 400 begins at step 410 where simulation engine 130 computes a velocity field associated with the fluid across all nodes of the simulation grid. The velocity field includes a velocity vector for each node of the grid, where a given velocity vector indicates the velocity of the fluid mass associated with a particular node. Simulation engine 130 may implement any technically feasible approach for computing the velocity field. Since many techniques for computing velocity fields are known in the art, the details of step 410 are omitted.

At step 420, for each node of the simulation grid, simulation engine 130 traces the velocity vector associated with the node upstream, i.e. in a direction opposite that of the velocity vector, to an inter-node point residing between grid nodes. Simulation engine 130 performs various computations relative to inter-nodes points as intermediate steps, as further described herein. The results of those various computations allow simulation engine to ultimately simulate the dynamics of the fluid at each node, for display to a viewer.

At step 430, for each inter-node point, simulation engine 130 interpolates a density value associated with the inter-node point by computing incoming density contributions received from adjacent nodes and corresponding incoming weight values. In doing so, simulation engine 130 may identify a fluid density value for a given node that is adjacent to an inter-node point, and then compute a fraction of that fluid density value that the adjacent node contributes to the inter-node point. For example, a given inter-node point could receive ⅕ of the density of a first adjacent node and ⅘ of the density of another adjacent node. The coefficients of the incoming density contributions received by the inter-node point are referred to herein as incoming weight values.

At step 440, for each node, simulation engine 130 computes the total outgoing density contributions distributed by a node to neighboring nodes and corresponding outgoing weight values. Simulation engine 130 performs step 440 relative to a given node by accumulating the density contributions that the node provides to any adjacent inter-node points. The density contributions provided by each node to each inter-node point are computed in step 430, described above. Simulation engine 130 then identifies a downstream node to which a given inter-node point contributes density, i.e. by tracing a velocity vector downstream from the inter-node point towards the node. In this fashion, an inter-node point may act as a proxy for distributing mass between neighboring nodes.

Simulation engine 130 computes a density contribution provided by a given node to a neighboring node as the fraction of the density associated with the given node that is provided to the adjacent node (by way of an adjacent inter-node point). The coefficients of the outgoing density contributions provided by the given node are referred to herein as outgoing weight values. The total outgoing weight values from a given node to all adjacent inter-node points may exceed 1.0, which potentially violates the conservation of mass. To rectify this potential violation, at step 450, simulation engine 130 adjusts the outgoing weight values to total one.

However, the adjustment performed at step 450 may influence the incoming weight values to each inter-node point, which also potentially violates the conservation of mass. To rectify this potential violation, at step 460, simulation engine 130 adjusts the incoming weight values computed at step 430 to total one. In performing step 460, simulation engine 130 may move mass between neighboring cells. However, in doing so, simulation engine 130 does not alter the total outgoing weight values discussed above, thereby conserving mass.

Once simulation engine 130 has computed a density value for each inter-node point, simulation engine 130 then determines a density value for each node by diffusing the density values from those inter-node points to adjacent nodes. Simulation engine 130 perform step 470 via any known technique for diffusing a value between nodes of a grid. Such techniques are known in the art and not reiterated here for the sake of simplicity.

The technique described above is also described, by way of example, below in conjunction with FIG. 5.

FIGS. 5A-5G are a series of exemplary diagrams illustrating a technique for updating the distribution of mass in a fluid simulation, according to one embodiment of the invention. For illustration purposes, the example described below is presented according to a one-dimensional (1D) grid, however, persons skilled in the art will readily recognize that the technique described in conjunction with the example are equally applicable to higher dimension grids, including two dimensional (2D) and three-dimensional (3D) grids. Simulation engine 130 may perform that technique by implementing the method 400, discussed above. Each of FIGS. 5A-5G illustrates exemplary nodes 510, 520, 530, and 540. Nodes 510, 520, 530, and 540 represent neighboring nodes within the fluid simulation generated by simulation engine 130. In each of the following figures, a different functionality associated with the method 400 is discussed.

FIG. 5A illustrates a velocity vector 500 that is associated with the fluid simulation and represents a portion of the velocity field computed at step 410 of the method 400. In the context of the example described herein, simulation engine 130 computes velocity vector 500 as the fluid velocity at node 530. However, simulation engine 130 could compute velocity vector 500 relative to any nodes of the simulation or collection of nodes. Simulation engine 130 is configured to trace velocity vector 500 backwards to inter-node point 531 that resides between nodes 510 and 520 by performing step 420 of the method 400. Inter-node point 531 represents the source of density associated with node 530 from a previous time step.

FIG. 5B illustrates density contributions 512 and 522 computed by simulation engine 130 at step 430 of the method 400. In the context of the present example, simulation engine 130 computes density contribution 512 as $0.20*\rho_i$, where $\rho_i$ is a density value associated with node 510 and 0.20 is a weight value associated with that contribution. Likewise, simulation engine 130 computes density contribution 522 as $0.80*\rho_{i+1}$, where $\rho_{i+1}$ is a density value associated with node 520 and 0.80 is a weight value associated with that contribution. Persons skilled in the art will note that the total of the weight values contributed to internode point 531 is equal to one. That total is referred to herein as the total incoming weight value, or simply as $\gamma$.

FIG. 5C illustrates the general principle that simulation engine 130 performs the exemplary functionality discussed thus far for each node in the simulation.

FIG. 5D illustrates density contributions 523 and 524 that are computed by simulation engine 130 at step 440 of the method 400. Density contributions 523 and 524 are provided by node 520 to adjacent nodes 510 and 530, respectively. In this example, simulation engine 130 computes density contribution 523 as $0.40*\rho_{i+1}$, where $\rho_{i+1}$ is the density value associated with node 520 and 0.40 is a weight value associated with that contribution. Likewise, simulation engine 130 computes density contribution 524 as $0.80*\rho_{i+1}$, where $\rho_{i+1}$ is again the density value associated with node 520 and 0.80 is a weight value associated with that contribution. In this example, simulation engine 130 uses inter-node point 531 as a proxy for computing the distribution of mass from node 520 to 530.

Persons skilled in the art will note that the total of the weight values contributed to inter-node point 531 exceed one, which potentially violates conservation of mass. That total is referred to herein as the total outgoing weight value, or simply as $\beta$.

FIG. 5E illustrates adjusted density contributions 523 and 524 that are computed by simulation engine 130 at step 450 of the method 400. In FIG. 5E, simulation engine 130 has modified the weight values associated with density contributions 523 and 524 so that the total outgoing weight value associated with node 520, $\beta$, is equal to one, thereby conserving mass. However, in doing so, simulation engine 130 may indirectly alter the total incoming weight values, $\gamma$, associated with inter-node points corresponding to those nodes.

FIG. 5F illustrates adjusted density contributions 512 and 522 that are computed by simulation engine 130 at step 460 of the method 400. In FIG. 5F, simulation engine 130 has modified the weight values associated with density contributions 512 and 522 so that the total incoming weight value associated with inter-node point 531, $\gamma$, is equal to one, thereby conserving mass.

FIG. 5G illustrates mass redistributions 525 and 545 that are also computed by simulation engine 130 at step 460. Simulation engine 130 may redistribute mass in the fashion illustrated in FIG. 5G in order to adjust $\gamma$, and may do so without affecting $\beta$.

Persons skilled in the art will recognize that many of the steps discussed above in conjunction with FIGS. 4-5G may be adapted for highly parallel processing. For example, a parallel processing unit, such as PPU 202 of FIG. 2, may be configured such that each thread in a collection of parallel execution threads computes an inter-node point associated with a different grid node in parallel with one another.

Persons skilled in the art will also recognize that the steps discussed above are applicable to simulation grids with any number of dimensions, and that the 1D example presented above is provided for illustration purposes only. For example, nodes 510 and 520 could be aligned with one another along a first dimension (e.g., X), while nodes 520 and 530 may be aligned with one another along a second dimension (e.g., Y). Further, nodes 520 and 540 could be aligned with one another along a third dimension (e.g., Z). As a general matter, any of the steps described above in conjunction with FIGS. 4-5G are applicable to any number of nodes that reside along any number of different (and potentially orthogonal) dimensions.

Referring back now to FIG. 3, once simulation engine 130 has updated the distribution of mass within the fluid simulation at step 320, simulation engine 130 may then perform the sharpening operation discussed in conjunction with step 330 to sharpen an interface associated with the simulated fluid. When sharpening the fluid interface, simulation engine 130 moves mass between adjacent cells of the grid in order to reduce the occurrence of cells that are only partially filled, as described in greater detail below in conjunction with FIG. 6.

Sharpening the Fluid Interface

FIG. 6 is a flow diagram of method steps for sharpening a fluid interface in a fluid simulation, according to one embodiment of the invention. Although the method steps are described in conjunction with the system of FIGS. 1-2, persons of ordinary skill in the art will understand that any system configured to perform the method steps, in any order, is within the scope of the invention.

As shown, a method 600 begins at step 610, where simulation engine 130 identifies a first node with a density value that is greater than a first threshold. Conceptually, the first node is "almost" full. At step 620, simulation engine 130 increases the density value of the first node by an increment. At step 630, simulation engine 130 reduces the density value(s) of one or more nodes in the neighborhood of the first node by an amount that totals the increment.

At step 640, simulation engine 130 identifies a second node with a density value that is less than a second threshold. Conceptually, the second node is "almost" empty. At step 650, simulation engine 130 decreases the density value of the second node by a decrement. At step 650, simulation engine increases the density value(s) of one or more nodes in the neighborhood of the second node by an amount that totals the decrement.

Simulation engine 130 typically performs the method 600 just once per time step of the fluid simulation, although persons skilled in the art will recognize that simulation engine 130 could perform the method 600 repeatedly to achieve varying levels of sharpness. The technique described above in conjunction with FIG. 6 is also described below in conjunction with FIGS. 7A-7H.

FIGS. 7A-7H are a series of exemplary diagrams illustrating a technique for sharpening a fluid interface in a fluid simulation, according to one embodiment of the invention. Simulation engine 130 may perform that technique by implementing the method 600, discussed above. FIGS. 7A-7D illustrate exemplary nodes 700 and 710, while FIGS. 7E-7H illustrate exemplary nodes 720 and 730. In each of FIGS. 7A-7H, a different functionality of the method 400 is discussed.

Figure 7A:
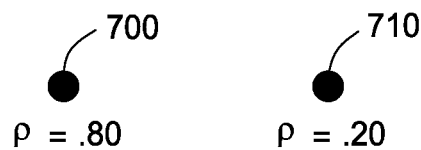
FIGS. 7A-7H are a series of exemplary diagrams illustrating a technique for sharpening a fluid interface in a fluid simulation, according to one embodiment of the invention.

FIG. 7A illustrates nodes 700 and 710 and respective density values, 0.80 and 0.20. Simulation engine 130 is configured to identify node 700 as having a density value that exceeds a first threshold by performing step 610 of the method 600.

Figure 7B:
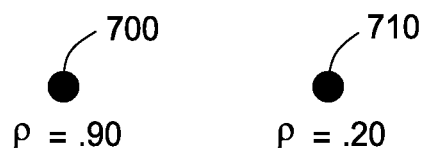

FIG. 7B illustrates nodes 700 and 710 yet again, although simulation engine has increased the density value of node 700 by the increment. Simulation engine 130 may increase the density value of node 700 by performing step 620 of the method 600.

Figure 7C:
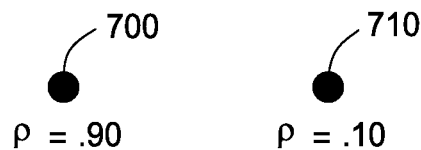
Figure 7D:
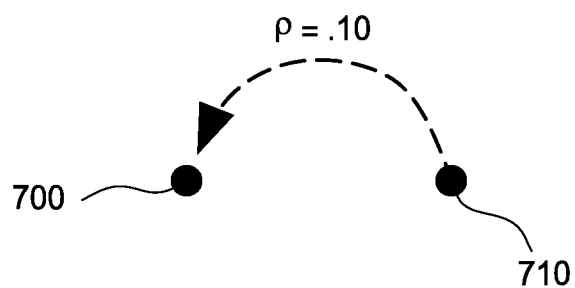

FIG. 7C illustrates nodes 700 and 710 yet again, although simulation engine 130 has decreased the density value of node 710 by the increment to compensate for having increased the density value of node 700. Generally, simulation engine 130 is configured to move mass between nodes 700 and 710 without increasing or decreasing the total mass associated with those nodes. This concept is also illustrated in FIG. 7D.

Figure 7E:
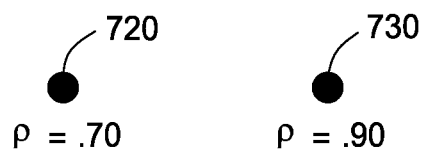

FIG. 7E illustrates nodes 720 and 730 and respective density values, 0.70 and 0.90. Simulation engine 130 is configured to identify node 720 as having a density value that falls beneath a second threshold by performing step 640 of the method 600.

Figure 7F:
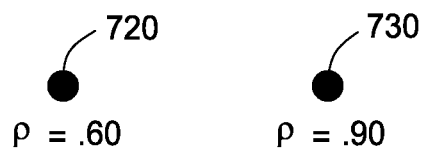

FIG. 7F illustrates nodes 720 and 730 yet again, although simulation engine has decreased the density value of node 720 by the decrement. Simulation engine 130 may decrease the density value of node 720 by performing step 650 of the method 600.

Figure 7G:
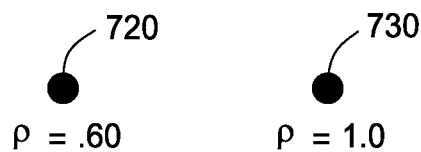
Figure 7H:
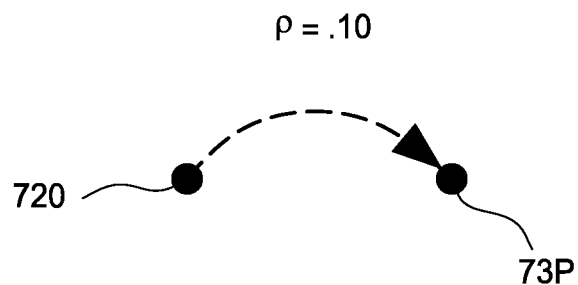

FIG. 7G illustrates nodes 720 and 730 yet again, although simulation engine 130 has increased the density value of node 730 by the decrement to compensate for having decreased the density value node 720. Generally, simulation engine 130 is configured to move mass between nodes 720 and 730 without increasing or decreasing the total mass associated with those nodes. This concept is also illustrated in FIG. 7H.

Persons skilled in the art will recognize that many of the steps discussed above in conjunction with FIGS. 6-7H may be adapted for highly parallel processing. For example, a parallel processing unit such as PPU 202 of FIG. 2 may be configured such that each thread in a collection of parallel execution threads moves density between nodes in parallel with other threads performing similar operations with other nodes.

Persons skilled in the art will also recognize that other sharpening techniques may also be implemented to sharpen the fluid interface associated with the fluid simulation. In one embodiment, simulation engine 130 may sharpen the fluid interface by computing a density gradient between nodes, and then modifying a mass flux value between those nodes in proportion to the density gradient. In doing so, simulation engine 130 may introduce divergence into the fluid simulation to avoid the occurrence of artifacts potentially caused by mass flux modifications. Other sharpening techniques may also be implemented, as appropriate.

In sum, a simulation engine performs a mass-conserving Eulerian fluid simulation by manipulating the distribution of density between nodes associated with the fluid simulation. The simulation engine traces a velocity field upstream to identify the source of mass that currently resides at a given node. The simulation engine then adjusts (i) the density contributions to that source from adjacent nodes and (ii) the density contributions provided by that source to the given node. In doing so, the simulation engine maintains conservation of mass at a local level between nodes within a given neighborhood. As a result, mass is conserved at a global level.

One advantage of the disclosed technique is that a fluid interface associated with the fluid simulation may appear more physically realistic, because numerical errors typically caused by violations of conservation of mass may be reduced. Another advantage is that the fluid simulation discussed herein is purely Eulerian in nature, and, thus, may be readily adapted for execution in parallel processing environments.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for modeling a distribution of mass associated with a simulated fluid, the method comprising:
generating a velocity vector for each node in a grid of nodes associated with a fluid simulation, the grid comprising at least a first node, a second node, and a third node;
tracing a velocity vector associated with the third node to an inter-node position that resides between the first node and the second node;
combining a first incoming density contribution derived from the first node with a second incoming density contribution derived from the second node to generate a density value for the inter-node position;
computing, via a processor, a first outgoing density contribution associated with the second node and a second outgoing density contribution associated with the second node based on the density value of the inter-node position;
adjusting a first set of weight values associated with the first outgoing density contribution and the second outgoing density contribution such that a sum of each weight value included in the first set of weight values equals one;
adjusting a second set of weight values associated with the first incoming density contribution and the second incoming density contribution such that a sum of each weight value included in the second set of weight values equals one, wherein adjusting the first set of weight values and the second set of weight values maintains conservation of mass when performing the fluid simulation;
updating the density value of the inter-node position based on the second set of weight values;
approximating a density value for the third node based on the density value of the inter-node position; and
performing, via the processor, the fluid simulation based on the density value for the third node.

2. The computer-implemented method of claim 1, further comprising performing one or more interpolation operations based on the first node and the second node to generate the first incoming density contribution and the second incoming density contribution.

3. The computer-implemented method of claim 2, wherein the one or more interpolation operations comprise a bilinear interpolation operation.

4. The computer-implemented method of claim 1, further comprising sharpening a fluid interface associated with the simulated fluid, wherein the fluid interface comprises a boundary between a first region of the grid of nodes that includes the simulated fluid and a second region of the grid of nodes that does not include the simulated fluid.

5. The computer-implemented method of claim 4, wherein sharpening the fluid interface comprises:
identifying the first node having a density value that exceeds a first threshold value;
increasing the density value associated with the first node by an increment; and
decreasing one or more density values associated with one or more nodes neighboring the first node, wherein a sum of all density value changes associated with the one or more nodes neighboring the first node equals the increment.

6. The computer-implemented method of claim 4, wherein sharpening the fluid interface comprises:
identifying the second node having a density value that is less than a second threshold value;
decreasing the density value associated with the second node by a decrement; and
increasing one or more density values associated with one or more nodes neighboring the second node, wherein a sum of all density value changes associated with the one or more nodes neighboring the second node equals the decrement.

7. The computer-implemented method of claim 4, wherein sharpening the fluid interface comprises:
computing a density gradient between two neighboring nodes included in the grid of nodes;
computing a mass flux between the two neighboring nodes; and
adjusting the mass flux between the two neighboring nodes based on the density gradient.

8. The computer-implemented method of claim 7, wherein sharpening the fluid interface further comprises reducing divergence associated with a velocity field to approximately zero.

9. The computer-implemented method of claim 1, wherein the first node the second node, and the third node are positioned within a one-dimensional grid, a two-dimensional grid, or a three-dimensional grid.

10. The computer-implemented method of claim 1, wherein computing the first outgoing density contribution and the second outgoing density contribution is performed via a first parallel execution thread included in a plurality of parallel execution threads executed within a parallel processing subsystem, wherein each parallel execution thread included in the plurality of parallel execution threads computes an outgoing density contribution for a different inter-node position included in the plurality of inter-node positions in parallel with one another.

11. The computer-implemented method of claim 1, wherein adjusting the first set of weight values and the second set of weight values reduces numerical errors caused by violations of the conservation of mass when performing the fluid simulation.

12. A non-transitory computer-readable medium that, when executed by a processing unit, causes the processing unit to model a distribution of mass associated with a simulated fluid, by performing the steps of:
combining a first incoming density contribution derived from a first node with a second incoming density contribution derived from a second node to generate a density value for an inter-node position, wherein the first node and the second node are included in a grid of nodes associated with a fluid simulation;
computing a first outgoing density contribution associated with the second node and a second outgoing density contribution associated with the second node based on the density value of the inter-node position;
adjusting a first set of weight values associated with the first incoming density contribution and the second incoming density contribution such that a sum of each weight value included in the first set of weight values equals one, wherein adjusting the first set of weight values maintains conservation of mass when performing the fluid simulation;

updating the density value of the inter-node position based on the first set of weight values;

approximating a density value for the third node based on the density value of the inter-node position; and performing the fluid simulation based on the density value for the third node.

13. The non-transitory computer-readable medium of claim 12, further comprising the step of performing one or more interpolation operations based on the first node and the second node to generate the first incoming density contribution and the second incoming density contribution.

14. The non-transitory computer-readable medium of claim 13, wherein the one or more interpolation operations comprise a bilinear interpolation operation.

15. The non-transitory computer-readable medium of claim 12, further comprising the step of sharpening a fluid interface associated with the simulated fluid, wherein the fluid interface comprises a boundary between a first region of the grid of nodes that includes the fluid and a second region of the grid of nodes that does not include the fluid.

16. The non-transitory computer-readable medium of claim 15, wherein the step of sharpening the fluid interface comprises:
identifying the first node having a density value that exceeds a first threshold value;
increasing the density value associated with the first node by an increment; and
decreasing one or more density values associated with one or more nodes neighboring the first node, wherein a sum of all density value changes associated with the one or more nodes neighboring the first node equals the increment.

17. The non-transitory computer-readable medium of claim 15, wherein sharpening the fluid interface comprises:
identifying the second node having a density value that is less than a second threshold value;
decreasing the density value associated with the second node by a decrement; and
increasing one or more density values associated with one or more nodes neighboring the second node, wherein a sum of all density value changes associated with the one or more nodes neighboring the second node equals the decrement.

18. The non-transitory computer-readable medium of claim 15, wherein sharpening the fluid interface comprises:
computing a density gradient between two neighboring nodes included in the grid of nodes;
computing a mass flux between the two neighboring nodes; and
adjusting the mass flux between the two neighboring nodes based on the density gradient.

19. The non-transitory computer-readable medium of claim 18, wherein sharpening the fluid interface further comprises reducing divergence associated with a velocity field to approximately zero.

20. The non-transitory computer-readable medium of claim 12, wherein the first node the second node are positioned within a one-dimensional grid, a two-dimensional grid, or a three-dimensional grid.

21. A computing device configured to model a distribution of mass associated with a simulated fluid, including:
a processor configured to:
generate a velocity vector for each node in a grid of nodes associated with a fluid simulation, the grid comprising at least a first node, a second node, and a third node;
combine a first incoming density contribution derived from the first node with a second incoming density contribution derived from the second node to generate a density value for an inter-node position;
compute a first outgoing density contribution associated with the second node and a second outgoing density contribution associated with the second node based on the density value of the inter-node position;
adjust a first set of weight values associated with the first incoming density contribution and the second incoming density contribution such that a sum of each weight value included in the first set of weight values equals one, wherein adjusting the first set of weight values and the second set of weight values maintains conservation of mass when performing the fluid simulation;
update the density value of the inter-node position based on the first set of weight values;
approximate a density value for the third node based on the density value of the inter-node position; and
perform the fluid simulation based on the density value for the third node.

22. The computing device of claim 21, further including:
a memory coupled to the processor and storing program instructions that, when executed by the processor, cause the processor to:
generate the velocity vector for each node in the grid of nodes;
combine the first incoming density contribution derived from the first node with the second incoming density contribution derived from the second node;
compute the first outgoing density contribution associated with the second node and the second outgoing density contribution associated with the second node;
adjust the first set of weight values;
update the density value of the inter-node position; and
approximate the density value for the third node.

23. The computing device of claim 21, wherein the processor is further configured to sharpen a fluid interface associated with the simulated fluid by:
identifying the first node having a density value that exceeds a first threshold value;
increasing the density value associated with the first node by an increment;
decreasing one or more density values associated with one or more nodes neighboring the first node, wherein a sum of all density value changes associated with the one or more nodes neighboring the first node equals the increment;
identifying the second node having a density value that is less than a second threshold value;
decreasing the density value associated with the second node by a decrement; and
increasing one or more density values associated with one or more nodes neighboring the second node, wherein a sum of all density value changes associated with the one or more nodes neighboring the second node equals the decrement.

24. The computing device of claim 21, wherein the processor is further configured to sharpen a fluid interface associated with the simulated fluid by:
computing a density gradient between two neighboring nodes included in the grid of nodes;
computing a mass flux between the two neighboring nodes; and adjusting the mass flux between the two neighboring nodes based on the density gradient.

* * * * *